Aug. 9, 1966     D. O. DAVIES ETAL     3,265,291
AXIAL FLOW COMPRESSORS PARTICULARLY FOR GAS TURBINE ENGINES
Filed Oct. 7, 1964
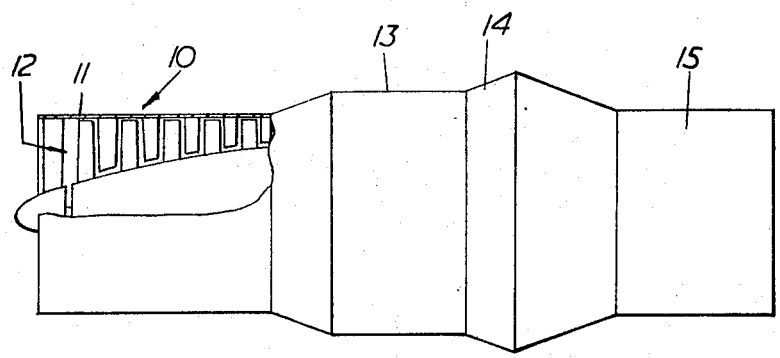
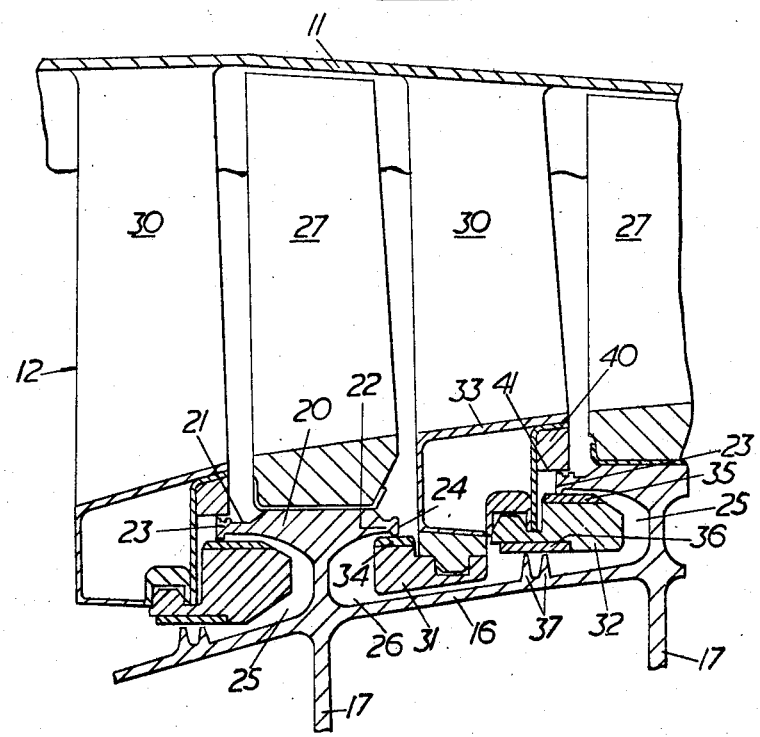

_United States Patent Office_

3,265,291
Patented August 9, 1966

---

3,265,291
AXIAL FLOW COMPRESSORS PARTICULARLY FOR GAS TURBINE ENGINES
David Omri Davies, Derby, and Robert Vaughan Blackhurst, Ripley, England, assignors to Rolls-Royce Limited, Derby, England, a company of Great Britain
Filed Oct. 7, 1964, Ser. No. 402,252
Claims priority, application Great Britain, Oct. 18, 1963, 41,352/63
5 Claims. (Cl. 230—122)

This invention concerns axial flow compressors, e.g. for gas turbine engines.

According to the present invention, there is provided an axial flow compressor comprising a compressor casing, a rotor shaft mounted within the casing and provided with a plurailty of axially spaced rotor discs each of which has a peripheral flange which extends axially upstream and downstream of the respective disc, each said peripheral flange being disposed radially outwardly of the shaft so as to define annular spaces therewith, a plurality of angularly spaced apart rotor blades carried by each said peripheral flange, and a plurality of rows of angularly spaced apart stator blades mounted within the casing, each row of stator blades carrying a sealing ring or sealing ring assembly which extends into both the adjacent annular spaces between two adjacent peripheral flanges and the shaft, the sealing ring or sealing ring assembly extending radially inwardly of both said adjacent peripheral flanges and being in sealing relationship with the radially inner surfaces thereof.

It will be appreciated that in a compressor constructed in accordance with the present invention each row of stator blades is sealed to the rotor structure on opposite axial sides of the row, so as to prevent reverse flow from one side of the row of stator blades to the other. Moreover, the said annular spaces are at least partly filled by the said sealing rings or sealing ring assemblies, whereby to diminish the extent to which air is pumped by the compressor into and out of these annular spaces.

It is desirable to prevent, so far as possible, the pumping of air into and out of these annular spaces, since such pumping has an adverse effect on the performance of the compressor.

Each sealing ring or sealing ring assembly is preferably provided with two radially outwardly facing seals which are in sealing relationship with the said radially inner surfaces and with at least one radially inwardly facing seal which is in sealing relationship with another surface or surfaces of the rotor, whereby to reduce or eliminate the extent to which sealing is affected by radial expansion and contraction.

Thus, there may be two radially inwardly facing seals one of which is in sealing relationship with the radially outer surface of said peripheral flange, and the other of which may be in sealing relationship with the rotor shaft.

Preferably each row of stator blades carries a sealing ring assembly comprising two axially spaced sealing rings, each said sealing ring being constituted by two half rings dowelled together.

The sealing ring or sealing ring assembly may be provided with sealing surfaces into which may cut ribs provided on said peripheral flanges.

The invention also comprises a gas turbine engine provided with a compressor as set forth above.

The invention is illustrated, merely by way of example, in the accompanying drawings, in which:

FIGURE 1 is a diagrammatic representation partly in section of a gas turbine engine provided with a compressor according to the present invention, and FIGURE 2 is a broken-away sectional view of part of the compressor of FIGURE 1.

Referring to the drawings, a gas turbine engine 10 comprises a casing 11 within which there are mounted in flow series a compressor 12, combustion equipment 13 and a turbine 14, the turbine exhaust gases being directed to atmosphere through an exhaust duct 15.

The engine 10 may be a vertical lift engine, that is to say, an engine adapted to produce vertical lift forces on an aircraft independently of those generated aerodynamically by forward flight thereof. Thus it may have a thrust to weight ratio of at least 8:1 and preferably of at least 12:1, or more.

In order to lighten its weight, the compressor 12 may be largely fabricated of synthetic resin material.

As shown in FIGURE 2, the compressor 12 comprises a rotor shaft 16 which is mounted concentrically within the casing 11, and which is provided with a plurality of axially spaced rotor discs 17.

Each of the rotor discs 17 has a peripheral flange 20 which has portions 21, 22 which respectively extend axially upstream and downstream of the respective rotor disc 17. The axially outer ends of the portions 21, 22 are respectively provided with sealing ribs 23, 24.

Each peripheral flange 20 is disposed radially outwardly of the rotor shaft 16, annular spaces 25, 26 being defined between the rotor shaft 16 and the portions 21, 22 respectively.

Each peripheral flange 20 carries a plurality of angularly spaced apart rotor blades 27.

A plurality of rows of angularly spaced apart stator blades 30 are mounted within the casing 11. Each row of stator blades 30 carries two axially spaced sealing rings 31, 32, each of which is constituted by two half rings, dowelled together. Each of the sealing rings 31, 32 is carried radially inwardly of and spigotted to one of the shrouds 33 of the stator blades 30.

Each sealing ring 31 extends into an annular space 26, whilst its adjacent sealing ring 32 extends into the adjacent annular space 25.

The sealing ring 31, is provided with a radially outwardly facing sealing surface 34 which is disposed radially inwardly of, and in sealing relationship with, the radially inner surface of the respective rib 24.

The sealing ring 32 is provided with a radially outwardly facing sealing surface 35 and with a radially inwardly facing sealing surface 36. The sealing surface 35 is disposed radially inwardly of and in sealing relationship with the radially inner surface of the adjacent rib 23. The sealing surface 36 is disposed radially outwardly of, and in sealing relationship with, ribs 37 on the rotor shaft 16.

Each row of stator blades 30 also carries a sealing ring 40 having a radially inwardly facing sealing surface 41 which is in sealing relationship with the radially outwardly facing surface of the respective rib 23.

The sealing surfaces 34, 35, 36, 41, are of softer material than, and are adapted to be cut into by, their respective ribs.

Each of the sealing rings 31, 32 is connected to one of the shrouds 33 by means including dogs or cross keys (not shown) which prevent the sealing rings 31, 32 from being rotated by the rotor discs 17 when the sealing surfaces 34, 35, 36, 41 are in contact with their respective ribs.

It will be appreciated that in the sealing ring assembly constituted by the sealing rings 31, 32, 40 two radially outwardly facing sealing surfaces and two radially inwardly facing sealing surface are provided, and this reduces or eliminates the extent to which sealing is affected by radial expansion and contraction.

The seals provided by the sealing surfaces 34, 35, 36 41 and their corresponding ribs will effect sealing of both axially spaced opposite sides of the stator blades 30 to the adjacent parts of the rotor, whereby to prevent a reversal of flow across the stator blades.

It will be noted that the pockets which exist between adjacent peripheral flanges 20 and the shaft 16 and which are, in part, constituted by the annular spaces 25, 26, will be largely occupied by the sealing rings 31, 32. This will prevent large amounts of air from being pumped into these pockets, and its is desirable to avoid such pumping since compressor performance is otherwise adversely affected.

The sealing rings 31, 32, 40 are adapted to be readily removed for replacement.

We claim:

1. An axial flow compressor comprising a compressor casing, a rotor shaft mounted within the casing, a plurality of axially spaced rotor discs provided on said rotor shaft, a peripheral flange provided on each disc and extending axially upstream and downstream of the respective disc, each said peripheral flange being disposed radially outwardly of the shaft so as to define annular spaces therewith, a plurality of angularly spaced apart rotor blades carried by each said peripheral flange, a plurality of rows of angularly spaced apart stator blades mounted within the casing, and a sealing ring assembly carried by each row of stator blades, each sealing ring assembly extending into both the adjacent annular spaces between two adjacent peripheral flanges and the shaft, extending radially inwardly of both said adjacent peripheral flanges, and being in sealing relationship with the radially inner surfaces of the upstream and downstream portions of said flanges.

2. An axial flow compressor comprising a compressor casing, a rotor shaft mounted within the casing a plurality of axially spaced rotor discs provided on said rotor shaft, a peripheral flange provided on each disc and extending axially upstream and downstream of the respective disc, each said peripheral flange being disposed radially outwardly of the shaft so as to define annular spaces therewith, a plurality of angularly spaced apart rotor blades carried by each said peripheral flange, a plurality of rows of angularly spaced apart stator blades mounted within the casing, a sealing ring assembly carried by each row of stator blades, each sealing ring assembly extending into both the adjacent annular spaces between two adjacent peripheral flanges and the shaft, and extending radially inwardly of both said adjacent peripheral flanges and two radially outwardly facing seals and at least one radially inwardly facing seal provided on each sealing ring assembly the two radially outwardly facing seals being in sealing relationship with radially inner surfaces of the upstream and downstream portions of said flanges and the radially inwardly facing seal being in sealing relationship with another surface of the rotor, whereby to reduce the extent to which sealing is affected by radial expansion and contraction.

3. An axial flow compressor comprising a compressor casing, a rotor shaft mounted within the casing a plurality of axially spaced rotor discs provided on said rotor shaft, a peripheral flange provided on each disc and extending axially upstream and downstream of the respective disc, each said peripheral flange being disposed radially outwardly of the shaft so as to define annular spaces therewith, a plurality of angularly spaced apart rotor blades carried by each said peripheral flange, a plurality of rows of angularly spaced apart stator blades mounted within the casing, a sealing ring assembly carried by each row of stator blades, each sealing ring assembly extending into both the adjacent annular spaces between two adjacent peripheral flanges and the shaft, and extending radially inwardly of both said adjacent peripheral flanges and two radially outwardly facing seals and two radially inwardly facing seals provided on each sealing ring assembly the two radially outwardly facing seals being in sealing relationship with the radially inner surfaces of the upstream and downstream portions of said flanges one of the radially inwardly facing seals being in sealing relationship with the radially outer surface of a said peripheral flange, and the other radially inwardly facing seal being in sealing relationship with the rotor shaft, whereby to reduce the extent to which sealing is affected by radial expansion and contraction.

4. An axial flow compressor comprising a compressor casing, a rotor shaft mounted within the casing a plurality of axially spaced rotor discs provided on said rotor shaft, a peripheral flange provided on each disc and extending axially upstream and downstream of the respective disc, each said peripheral flange being disposed radially outwardly of the shaft so as to define annular spaces therewith, a plurality of angularly spaced apart rotor blades carried by each said peripheral flange, a plurality of rows of angular spacedly apart stator blades mounted within the casing, and a sealing ring assembly carried by each row of stator blades, each sealing ring assembly comprising two axially spaced sealing rings, each of which is constituted by two half rings dowelled together and extending into both the adjacent annular spaces between two adjacent peripheral flanges and the shaft, extending radially inwardly of both said adjacent peripheral flanges and being in sealing relationship with the radially inner surfaces of the upstream and downstream portions of said flanges.

5. An axial flow compressor comprising a compressor casing, a rotor shaft mounted within the casing a plurality of axially spaced rotor discs provided on said rotor shaft, a peripheral flange provided on each disc and extending axially upstream and downstream of the respective disc, each said peripheral flange being disposed radially outwardly of the shaft so as to define annular spaces therewith, a plurality of angularly spaced apart rotor blades carried by each said peripheral flange, a plurality of rows of angular spacedly apart stator blades mounted within the casing, and a sealing ring assembly carried by each row of stator blades, each sealing ring assembly extending into both the adjacent annular spaces between two adjacent peripheral flanges and the shaft, extending radially inwardly of both said adjacent peripheral flanges, and being in sealing relationship with the radially inner surfaces of the upstream and downstream portions of the flanges, sealing surfaces being provided on said sealing ring assembly and ribs being provided on said peripheral flanges, the ribs cutting into the sealing surfaces to make sealing contact therewith.

References Cited by the Examiner

UNITED STATES PATENTS

| | | | |
|---|---|---|---|
| 2,652,685 | 9/1953 | Willgoos | 230—116 |
| 2,757,857 | 8/1956 | Savin | 230—116 |
| 2,762,559 | 9/1956 | Faught | 230—116 |
| 2,795,393 | 6/1957 | Halford et al. | 230—122 |
| 2,918,252 | 12/1959 | Haworth | 253—39 |
| 2,988,325 | 6/1961 | Dawson | 253—39 |
| 2,994,508 | 8/1961 | Howald | 253—39 |
| 3,091,382 | 5/1963 | Shelley | 230—116 |
| 3,146,938 | 9/1964 | Smith | 230—122 |

MARK NEWMAN, *Primary Examiner.*

H. F. RADUAZO, *Assistant Examiner.*